(12) United States Patent
Fontana et al.

(10) Patent No.: US 8,017,866 B2
(45) Date of Patent: Sep. 13, 2011

(54) DEVICE FOR OPENING AND/OR CLOSING CABLE DUCTS

(75) Inventors: Rodolfo Fontana, Bisuschio (IT); Enzo Rizzi, Selvazzano Dentro (IT); Simone Toniolo, Vicenza (IT)

(73) Assignee: ABB S.p.A., Milan (IT)

( * ) Notice: Subject to any disclaimer, the term of this patent is extended or adjusted under 35 U.S.C. 154(b) by 144 days.

(21) Appl. No.: 12/407,513

(22) Filed: Mar. 19, 2009

(65) Prior Publication Data

US 2009/0236124 A1 Sep. 24, 2009

(30) Foreign Application Priority Data

Mar. 21, 2008 (IT) .................. MI2008A0503

(51) Int. Cl.
 *H02G 3/04* (2006.01)
(52) U.S. Cl. ............ 174/72 A; 174/68.1; 174/135; 174/68.3; 439/207; 248/68.1

(58) Field of Classification Search ............... 174/68.1, 174/68.3, 72 A, 95–98, 135; 248/68.1; 439/207
See application file for complete search history.

(56) References Cited

U.S. PATENT DOCUMENTS

| | | | |
|---|---|---|---|
| 4,338,484 A * | 7/1982 | Littrell ............ | 174/482 |
| 6,107,576 A * | 8/2000 | Morton et al. ........ | 174/101 |
| 6,756,544 B2 * | 6/2004 | Handler ............. | 174/68.1 |
| 7,385,148 B2 * | 6/2008 | Picard et al. ........ | 174/481 |

* cited by examiner

*Primary Examiner* — Dhirubhai R Patel
(74) *Attorney, Agent, or Firm* — Connolly Bove Lodge & Hutz LLP

(57) ABSTRACT

A device for opening and/or closing cable duct is provided. The device includes a main body shaped so as to provide a gripping surface for an operator. The main body includes at least one base wall which extends, at least partly, according to a reference plane and which is associated with at least one shaped edge which extends from the base wall towards a further reference plane. At least one joining wall connects the base wall and the shaped edge integrally with each other.

14 Claims, 12 Drawing Sheets

DEVICE FOR OPENING AND/OR CLOSING CABLE DUCTS

TECHNICAL FIELD

The present invention relates to a device for opening and/or closing cable ducts for low voltage electrical systems.

The use of cable ducts in low voltage electrical systems (i.e. for voltage values below 1 kV) for civil and industrial use is widely known.

BACKGROUND ART

FIG. 1 shows a sectional view of a cable duct 20 of convention type.

The duct 20 comprises a base 21 which can be easily fixed to the wall of a building and/or to the wall of a switchboard.

The duct 20 also comprises a pair of lateral walls 23 and 24, which comprise a plurality of flexible fins 28 which rise perpendicularly with respect to the base 21 for the entire length of the duct.

The fins 28 are mutually spaced so as to form a plurality of inspection windows along each side of the duct.

In other prior art solutions, the lateral walls 23 and 24 are composed of relatively flexible elements with respect to the base of the duct but without windows or slots.

The duct 20 also comprises a cover 25, removably connected to the walls 23 and 24. For this purpose, the edges of the cover 25 and the lateral walls 23 and 24 are provided with suitable removable coupling means 22 suitable to mutually engage.

When the cable duct is installed, the cover must be removed in order to access its inside.

Currently, this operation is relatively difficult due to the considerable mechanical strength exerted by the coupling means 22 and is made more difficult by the relative flexibility of the lateral walls 23-24 with respect to the base 21, above all in the case in which these walls comprise flexible fins.

Other factors which make removal of the cover relatively complicated are, for example, the considerable length of the duct (which can even extend for several meters) or the fact that the duct is located in positions that are not easy for the operator to reach.

Therefore, to remove the cover, more than one operator and/or the use of work utensils, such as screwdrivers or similar tools, are currently required.

This implies an evident waste of time and labor, with relative increase in the installation or operating costs of the electrical system.

The use of utensils commonly used in installation works can also cause damage to the structure of the duct, above all to the lateral walls or cover.

For the same reasons as those mentioned above, it is also laborious to position the cover 25 in its customary closing position, for example after performing an operation or during installation.

From the above, it is evident that in the civil and industrial installation sector, there is great need for adequate equipment which simplifies the performance of operations to open and close cable duct.

SUMMARY OF DISCLOSURE

The main aim of the present invention is to provide a device for opening and/or closing cable duct which allows the aforesaid drawbacks to be overcome.

Within this aim, another object of the present invention is to provide a device which allows, even only one operator to rapidly and effectively perform the operations to open and close cable duct.

Another object of the present invention is to provide a device which allows the cover of the cable duct to be removed and/or repositioned without damaging the structure of the duct.

Another object of the present invention is to provide a device which is easy to use, even when the operator is in awkward positions or positions in which balance is precarious.

Another object of the present invention is to provide a device that is easy to produce industrially at competitive costs.

In its most general definition, the device according to the invention comprises at least one main body, in turn comprising at least one base wall, a shaped edge and a joining wall. These elements are mutually positioned so as to allow the operator to obtain, with extreme ease, disengagement of the cover from the lateral walls, during the operation to open the cable duct, or their mutual engagement, during the closing operation.

According to embodiments which will be better described below, the device according to the invention allows the operator to operate on only one side of the duct, according to a predefined direction, or on both sides, even simultaneously.

The device according to the invention is characterized in that it is extremely easy to use, also in awkward operating conditions for the operator.

As will be more apparent below, the device according to the invention presents a very simple structure, which is easy to produce at industrial level.

BRIEF DESCRIPTION OF THE DRAWINGS

Further characteristics and advantages of the present invention will be more apparent with reference to the description given below and to the accompanying figures, provided purely for explanatory and non-limiting purposes, wherein.

BEST AND VARIOUS MODES FOR CARRYING OUT DISCLOSURE

Figure 1:
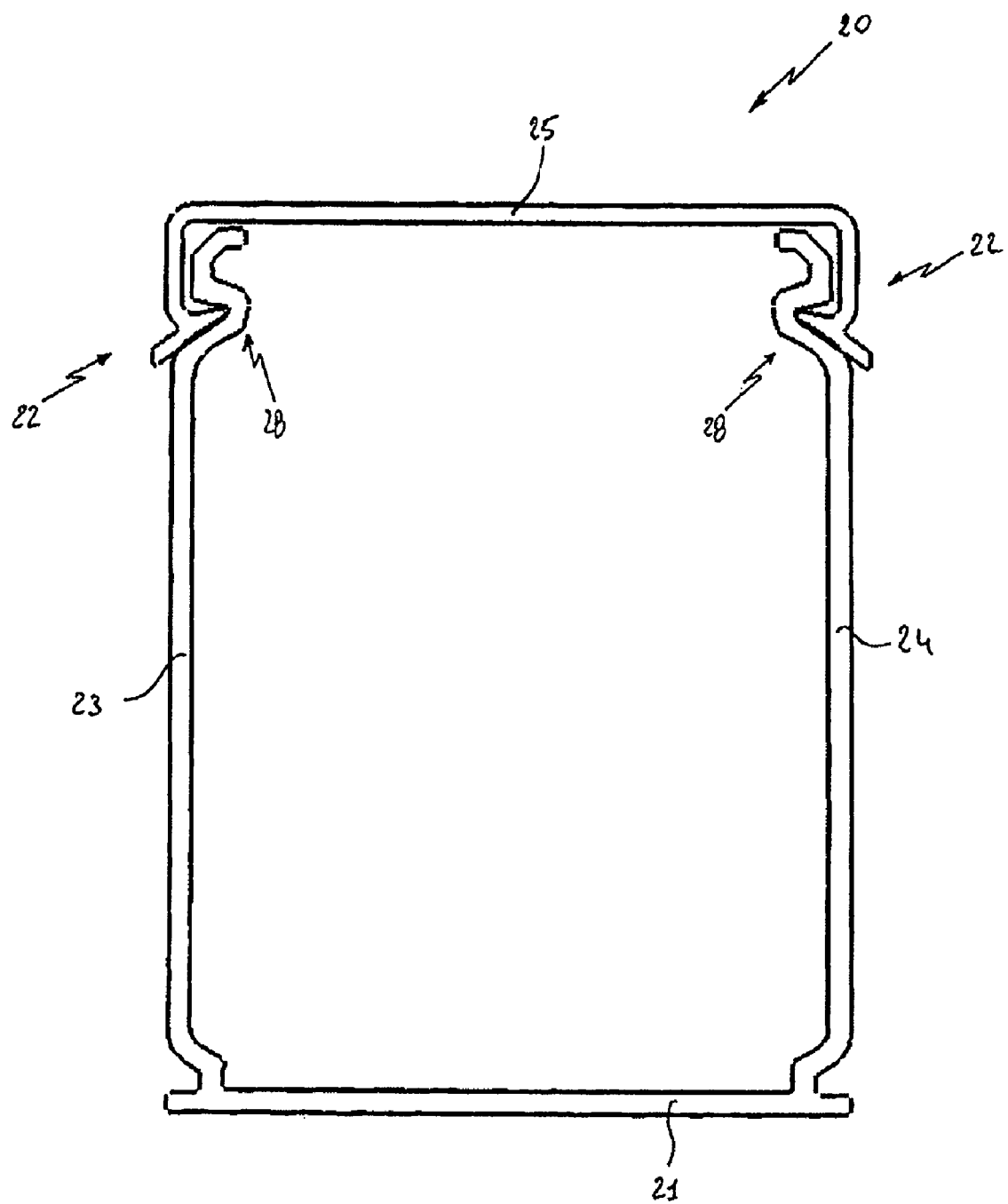
FIG. 1 shows a sectional view of the structure of a conventional cable duct.

With reference to the aforesaid figures, the present invention relates to a device 100 for performing an operation to open and/or close cable duct 200.

Preferably, the device 100 is made of thermoplastic material, such as filled polycarbonate.

However, other materials such as metals or wood, can also be used.

The device 100 comprises a main body 150 comprising at least one base wall 10 which extends, at least partly, according to at least one main reference plane 101. In other words, the base wall 10 comprises at least one portion extending according to at least the reference plane 101.

The device 100 also comprises a shaped edge 11 which extends, preferably with a curvilinear trend 101, and at least a further reference plane 102, parallel to the plane 101.

The shaped edge 11 is provided with an end (first end or upper end) 112 which joins with the base wall 10, preferably at the reference plane 101, and a further end (second end or lower end) 111 which lies on the reference plane 102.

The device 100 also comprises a joining wall 13 which connects the base wall 10 and the shaped edge 11 integrally with each other.

Advantageously, the joining wall 13 extends transversely, preferably substantially orthogonal with respect to the base wall and to the shaped edge 11. It can be shaped so as to follow the profile of the shaped edge 11 along the extension thereof between the reference planes 101 and 102.

Preferably, the main body 150 comprises, at the base wall 10, a first through cavity 12 defined by a lateral wall 14 which extends substantially perpendicular with respect to the base wall 11, in the direction of the reference plane 102.

The cavity 12 advantageously presents a substantially elliptical shape, oriented according to the longitudinal axis of extension 50 of the device 100.

The lateral wall 14 advantageously presents a shaped portion 141, suitable to facilitate safe gripping of the device 100 by the operator.

Preferably, also the base wall 10 comprises a shaped portion 142, located to correspond with said shaped portion 141, so as to further facilitate gripping.

Figure 3:
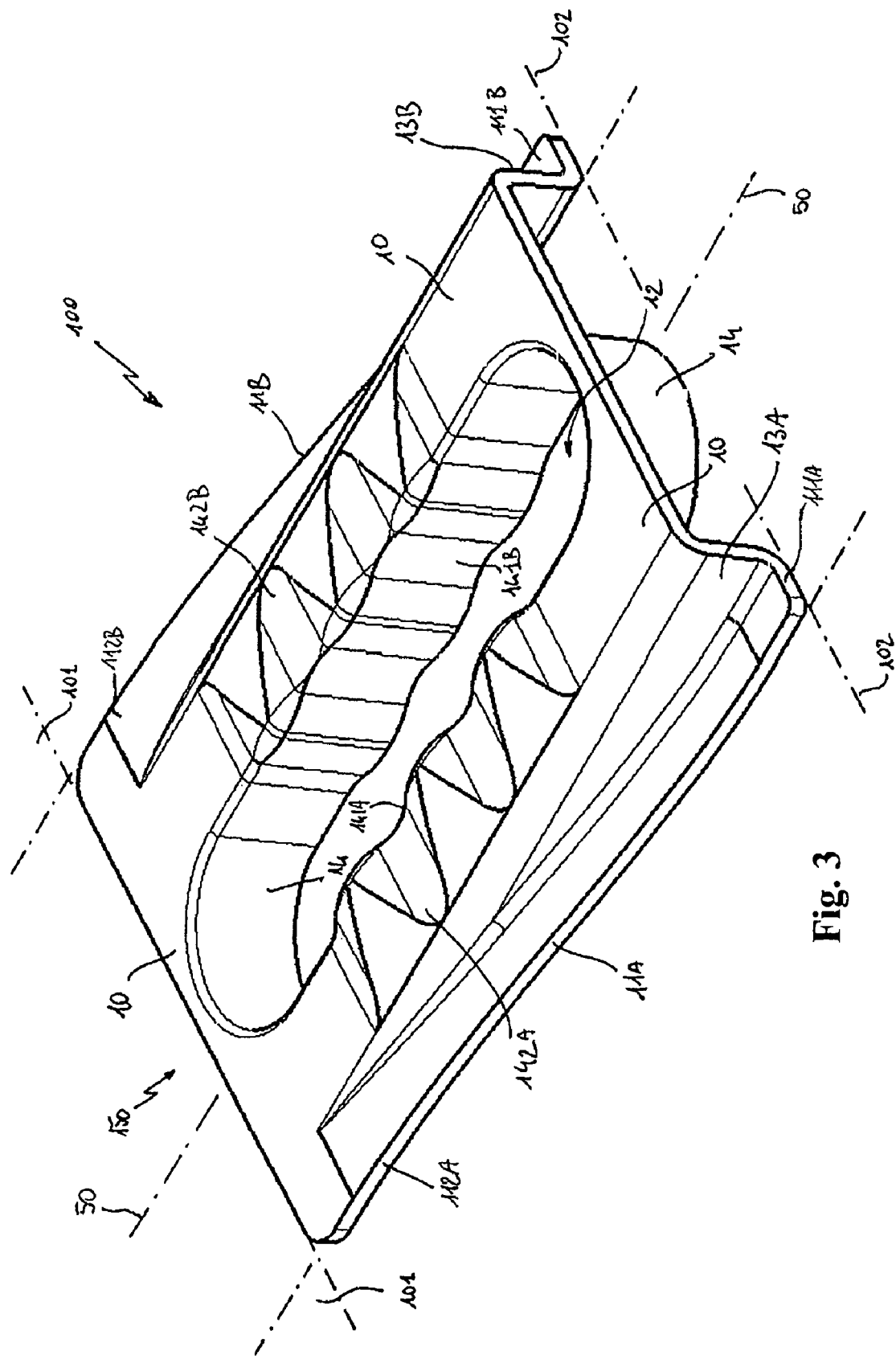
FIG. 3 shows a perspective view of the device according to the invention in a further embodiment.
Figure 4:
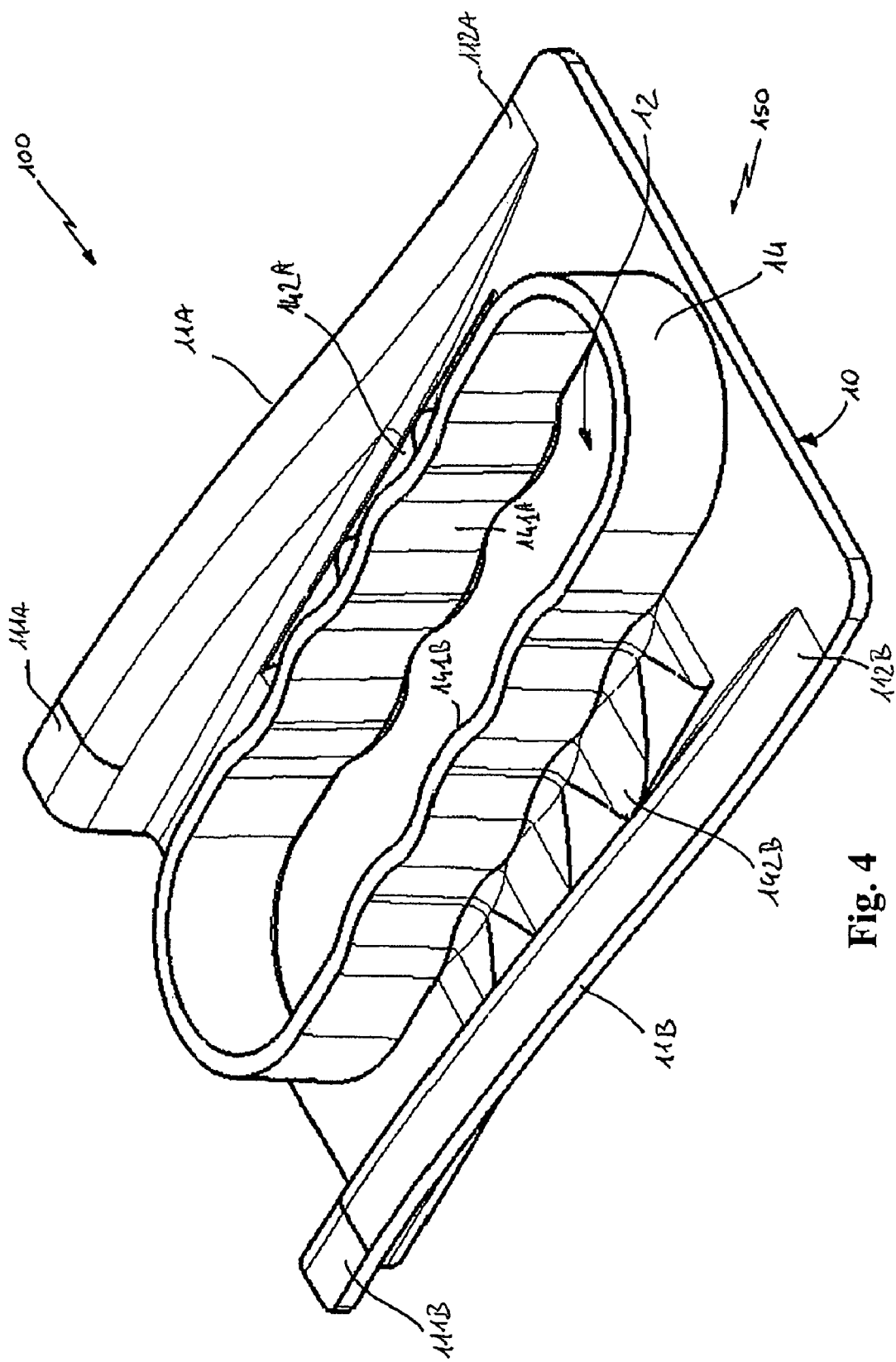
FIG. 4 shows a further perspective view of the device according to the invention in the embodiment of FIG. 3.
Figure 5:
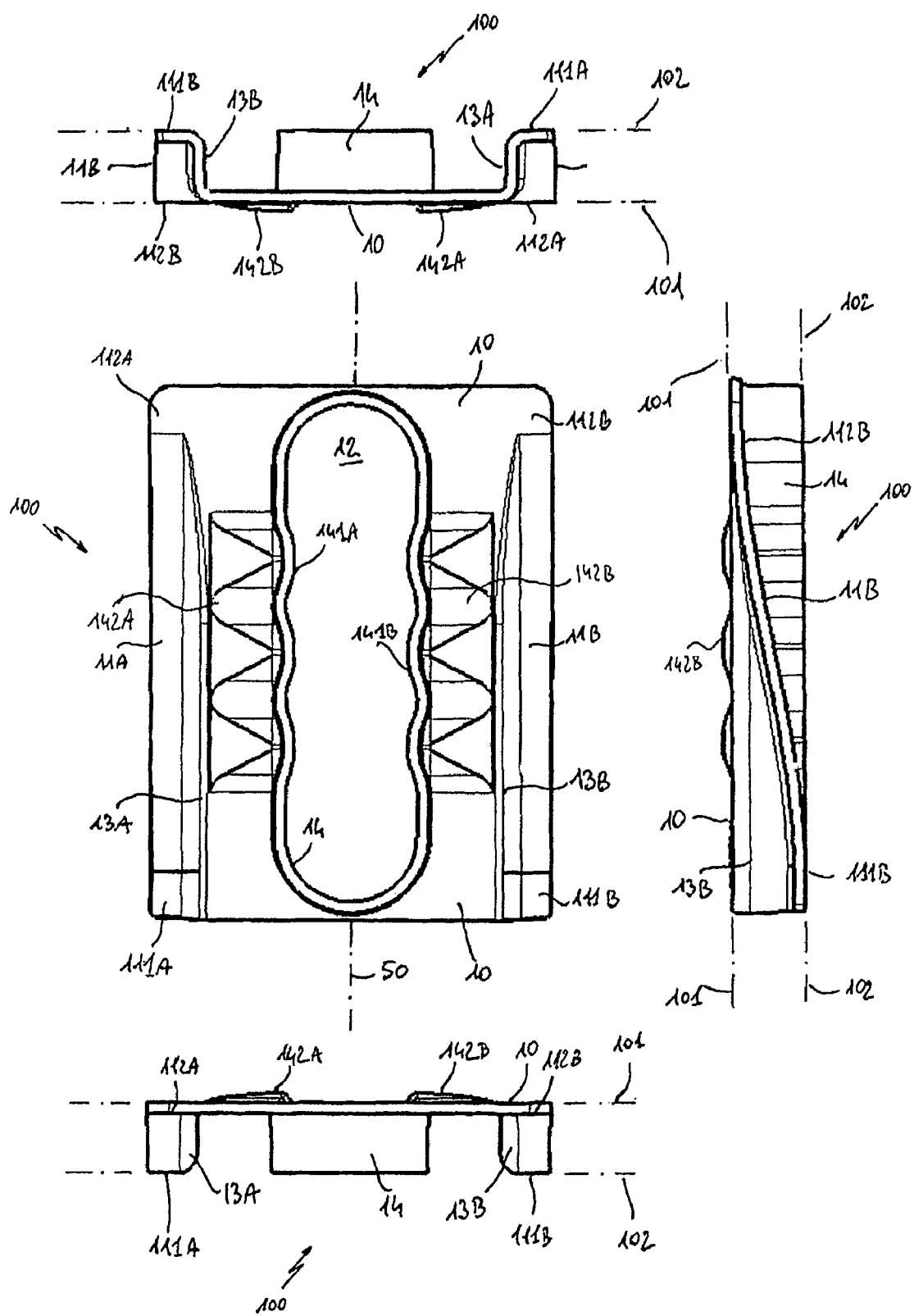
FIG. 5 shows a series of further views of the device according to the invention in the embodiment of FIG. 3.
Figure 6A:
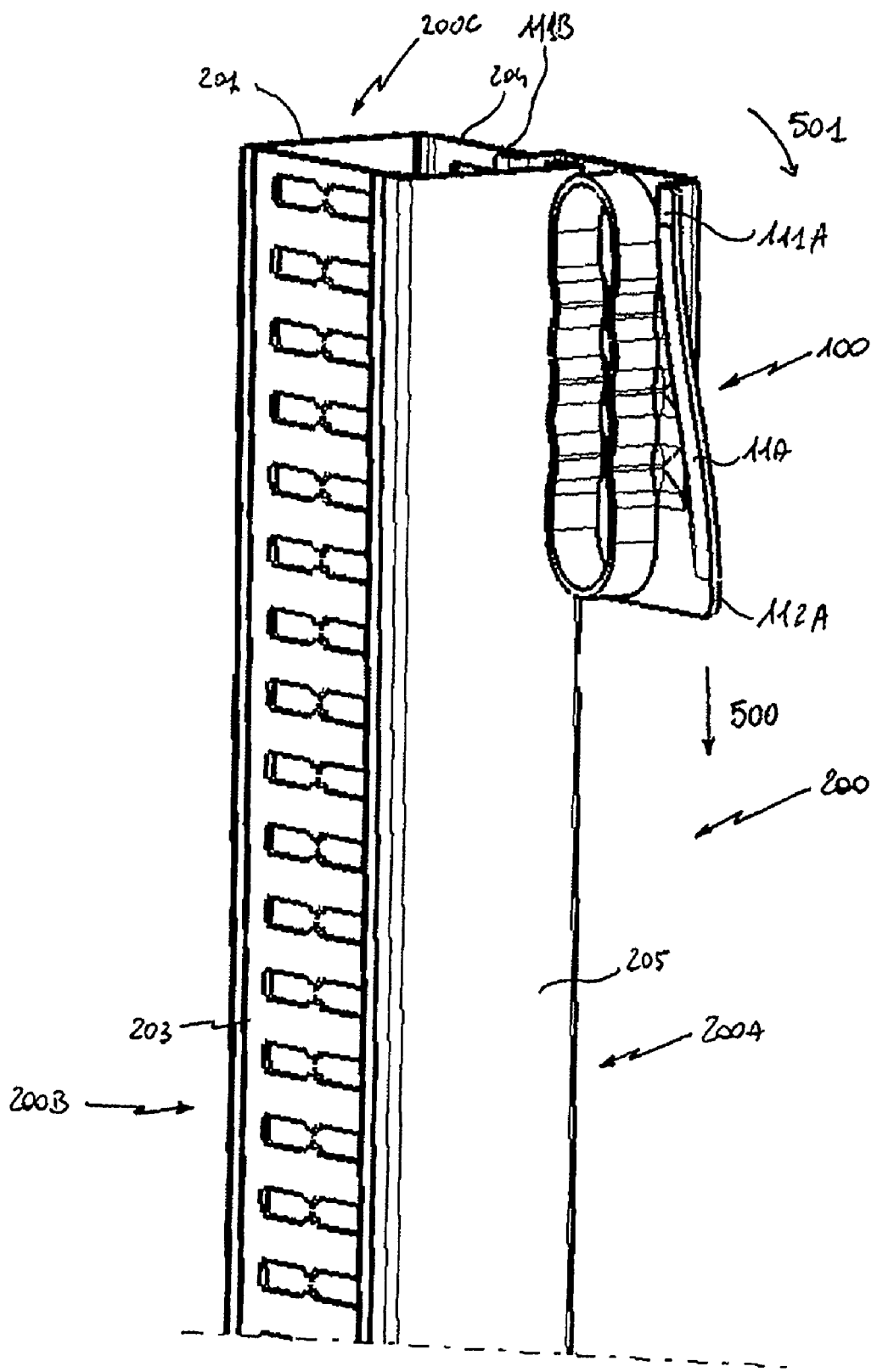
FIGS. 6A-6B, 7A-7B and 8 schematically show examples of operational use of the device according to the invention in the embodiment of FIG. 3.
Figure 6B:
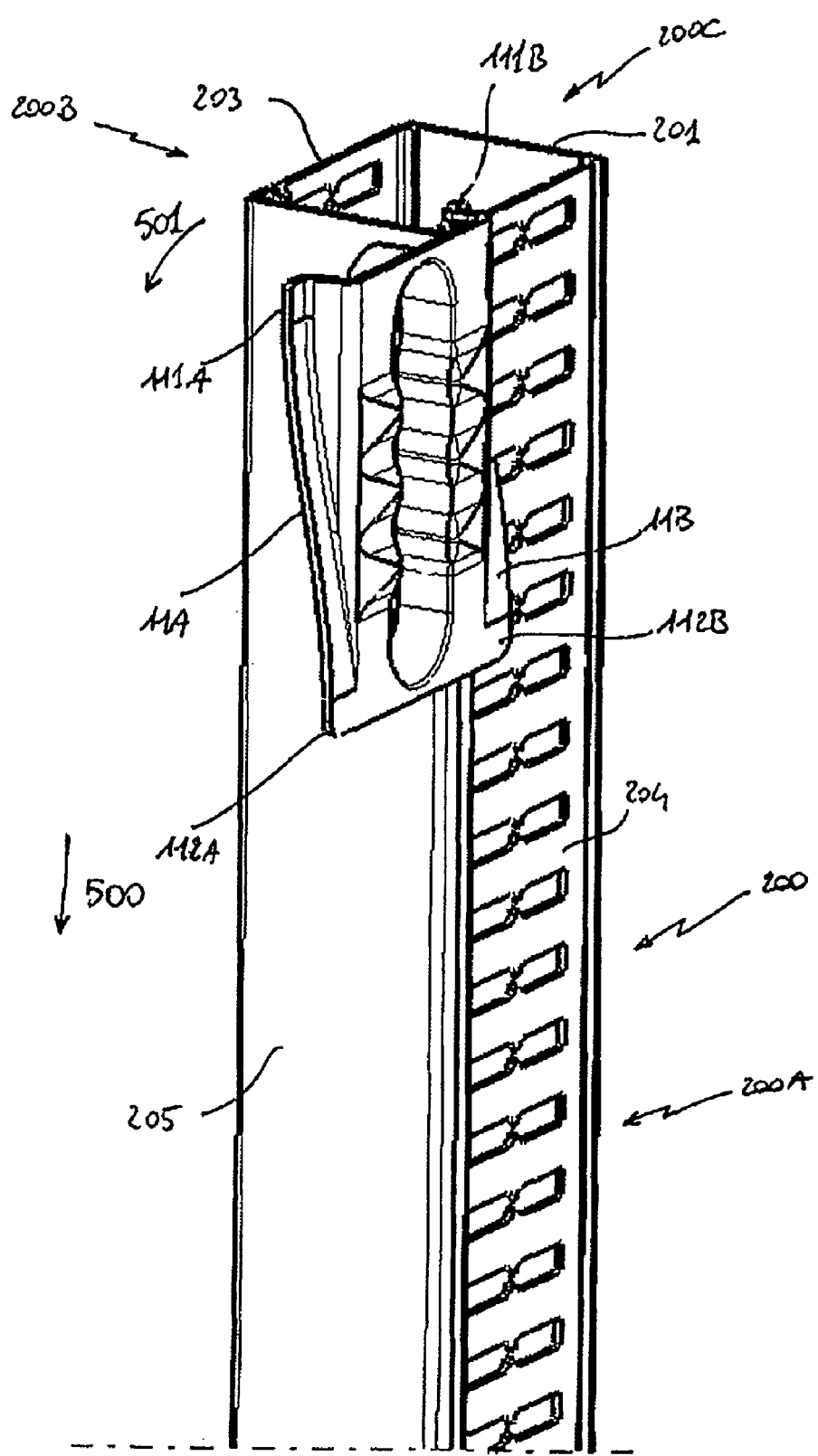
Figure 7A:
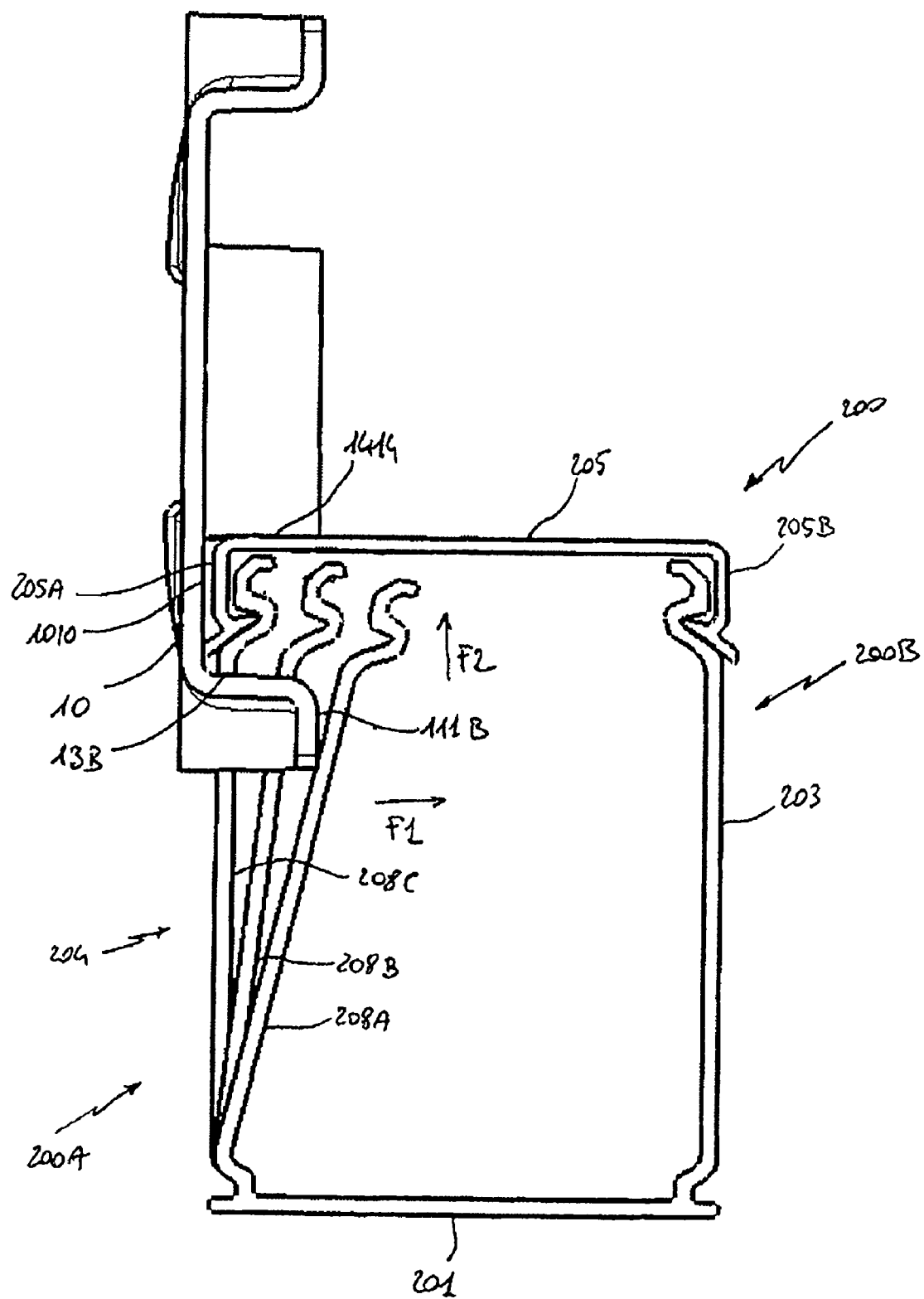
Figure 7B:
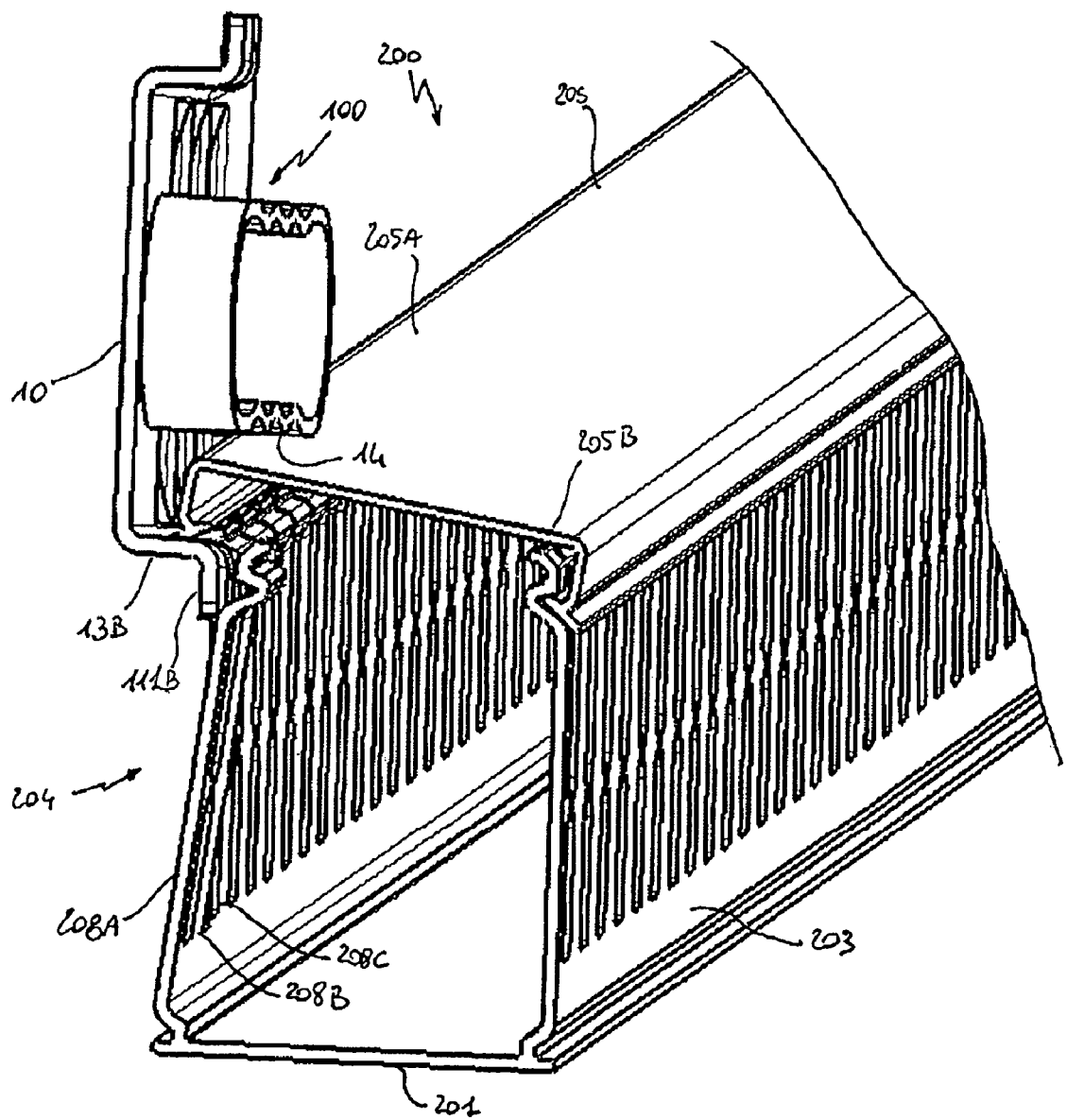
Figure 8:
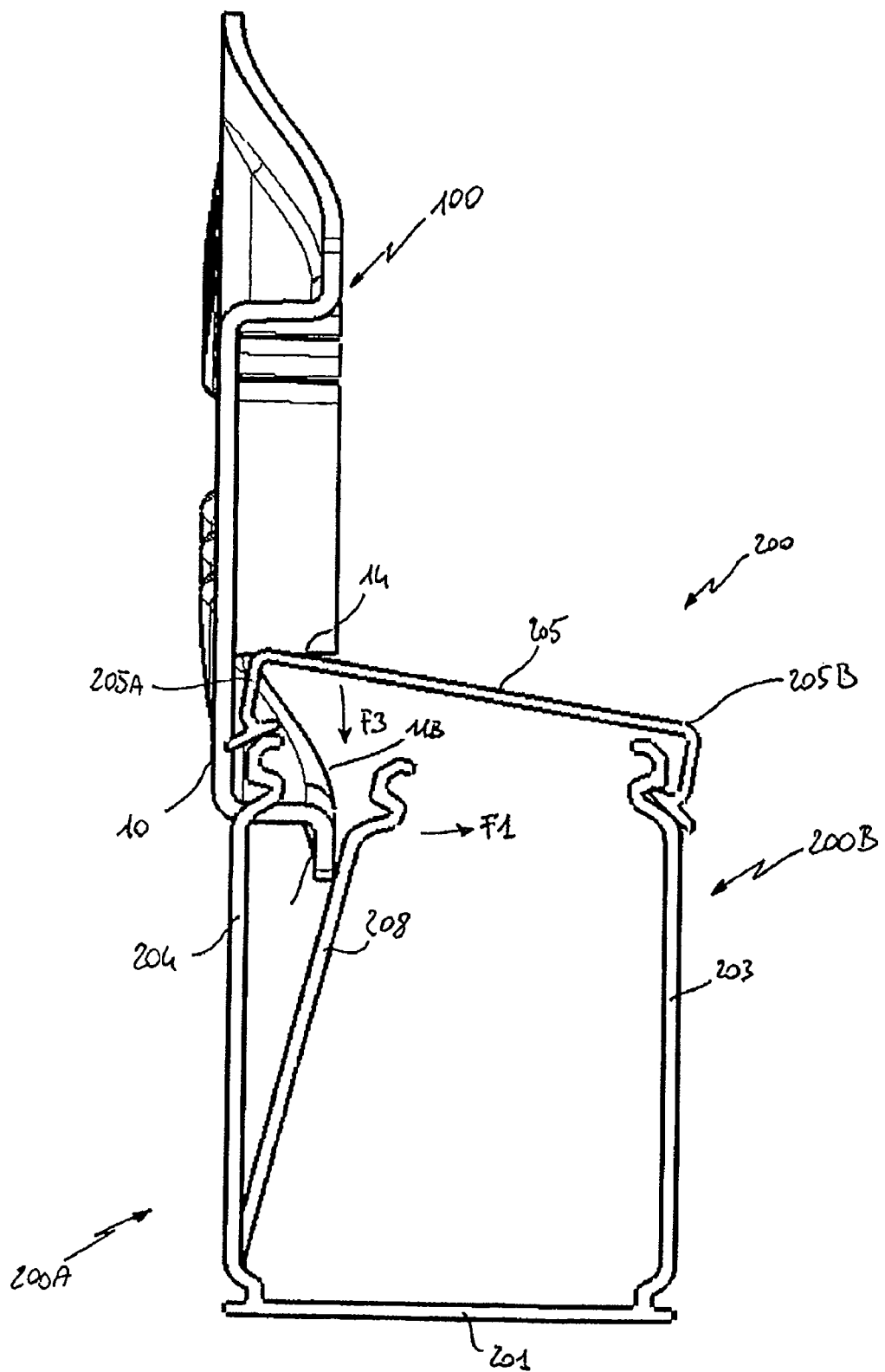

In a preferred embodiment, shown in FIG. 3, the device 100 comprises a first shaped edge 11A and a second shaped edge 11B, associated with the base wall 10 in opposite positions with respect to the longitudinal axis 50.

The shaped edges 11A and 11B both extend with a curvilinear trend between the reference planes 101 and 102.

In particular, both the shaped edges are provided with ends (first ends or upper ends) 112A and 112B which join with the base wall 10, at the reference plane 101, and with further ends (second ends or lower ends) 111A and 111B which lie on the reference plane 102.

To appropriately join the shaped edges 11A and 11B with the base wall 10, the device 100 preferably comprises a first joining wall 13A and a second joining wall 13B, associated with the base wall 10 in opposite positions with respect to the longitudinal axis 50.

Also in this embodiment, the main body 150 comprises a through cavity 12, the same as the one described above, advantageously positioned in median position with respect to the shaped edges 11A and 11B, along the longitudinal axis 50.

The lateral wall 14 which defines the cavity 12 advantageously presents shaped portions 141A and 141B disposed on both sides of the cavity 12, so as to facilitate gripping of the operator on both sides of the main body 150.

Similarly, again for the same purpose, the base wall 10 presents two shaped portions 142A and 142B, positioned to correspond with the shaped portions 141A and 141B.

With reference now to FIGS. 6A-6B, 7A-7B and 8, the methods of using the device 100, in the embodiment of FIG. 3, shall now be described.

In particular, use of the device 100 on cable duct 200 comprising lateral walls 203 and 204 provided with flexible tabs 208 is described.

It is understood that the device 100 can be used with the same effectiveness and in the same manner on cable ducts with closed side walls, without windows or slots.

With regard to the opening operation, this must be performed starting from one of the sides of the cable duct 200, for example the side 200A.

Holding the device, gripping the main body 150 at the shaped edge 11A, the operator positions it on a segment 200C of the duct 20, preferably at one of the ends thereof The device 100 is positioned so as to bring the end 111B of the shaped edge 11B into contact with the lateral wall 204 of the duct 20.

With a simple operation, this end 111B is pushed towards the inside of the duct 200 so as to cause one of more fins 208 of the lateral wall 204 to bend. In this manner, a portion 1010 of the base wall 10 and a portion 1414 of the lateral wall 14 are brought to abut against the edge 205A of the cover 205, ensuring stable initial positioning of the device 100.

The operator can then move the device 100 according to the forward direction 500, so as to drive the shaped edge 11B along the side 200A in the direction of the opposite end 112B of the shaped edge 11B.

On the fins 208 with which it comes into sliding contact, the shaped edge 11B exerts a force F1 directed towards the inside of the duct 200.

It must be noted how the force F1 is exerted progressively, due to the curvilinear shape of the shaped edge 11B. The fin 208A which is located at the end 112B of the shaped edge 11B is subjected to greater bending with respect to the fin 208B located further downstream.

Similarly, the fin 208C, located even further downstream, with respect to the movement of the device 100, will be subjected to less bending, and so forth.

The bending imparted by the shaped edge 11B at it ends 111B is capable of completely releasing the fins 208 from the edge 205A of the cover 205.

To ensure that the cover 205 is completely lifted off the segment of duct on which it has just been detached (and thus prevent the fins upstream of the device 100 from engaging with the edge 205A once more, after they return to the idle position) the operator can rotate, every so often or constantly during the operation, the device 100 according to the direction of rotation 501, i.e. away from the base 201 of the duct 200.

In this manner, a force F2 can be exerted with the joining wall 13B which allows the edge 205A to be moved away from the area in which it engages with the fins 208, lifting it with respect to the lateral wall 204.

Once the operation has been performed on entire length of the cable duct 200, the edge 205A of the cover 205 will be completely released from the lateral wall 204.

At this point, with a simple manual rotation the operator can also release the edge 205B from the lateral wall 203, completing removal of the cover 205.

To perform the operation to close the duct 200, the device 100 can be used in a substantially dual manner with respect to that described above.

In this case, the operator can first engage the edge 205B with the lateral wall 203, along the side 200B of the duct 200.

With a simple rotation, the operator can manually bring the edge 205A into contact with the fins 208 of the lateral wall 204.

The user can then position the device 100 at the side 200A of the duct 200, so that a certain number of fins 208 are pushed towards the inside of the duct 200 facilitating engaging thereof with a segment of the edge 205A.

The operator can then proceed to move the device 100 along the duct 200.

During this movement of the device 100, the shaped edge 11B is placed in sliding contact with the wall 204 and exerts a force F1, suitable to move the fins 208 towards the inside of the duct 200. Also in this case, the force F1 is exerted progressively, due to the curvilinear shape of the shaped edge 11B.

Simultaneously, by means of the lateral wall 14, a force F3 can be exerted suitable to move the edge 205A toward the base 201, facilitating engagement of the edge 205A with the fins 208, which return to an idle position after the temporary movement imparted by the shaped edge 11B.

Moving the device 100 along the duct 200, the operator can thus obtain complete closing of the cover 205.

Figure 2:
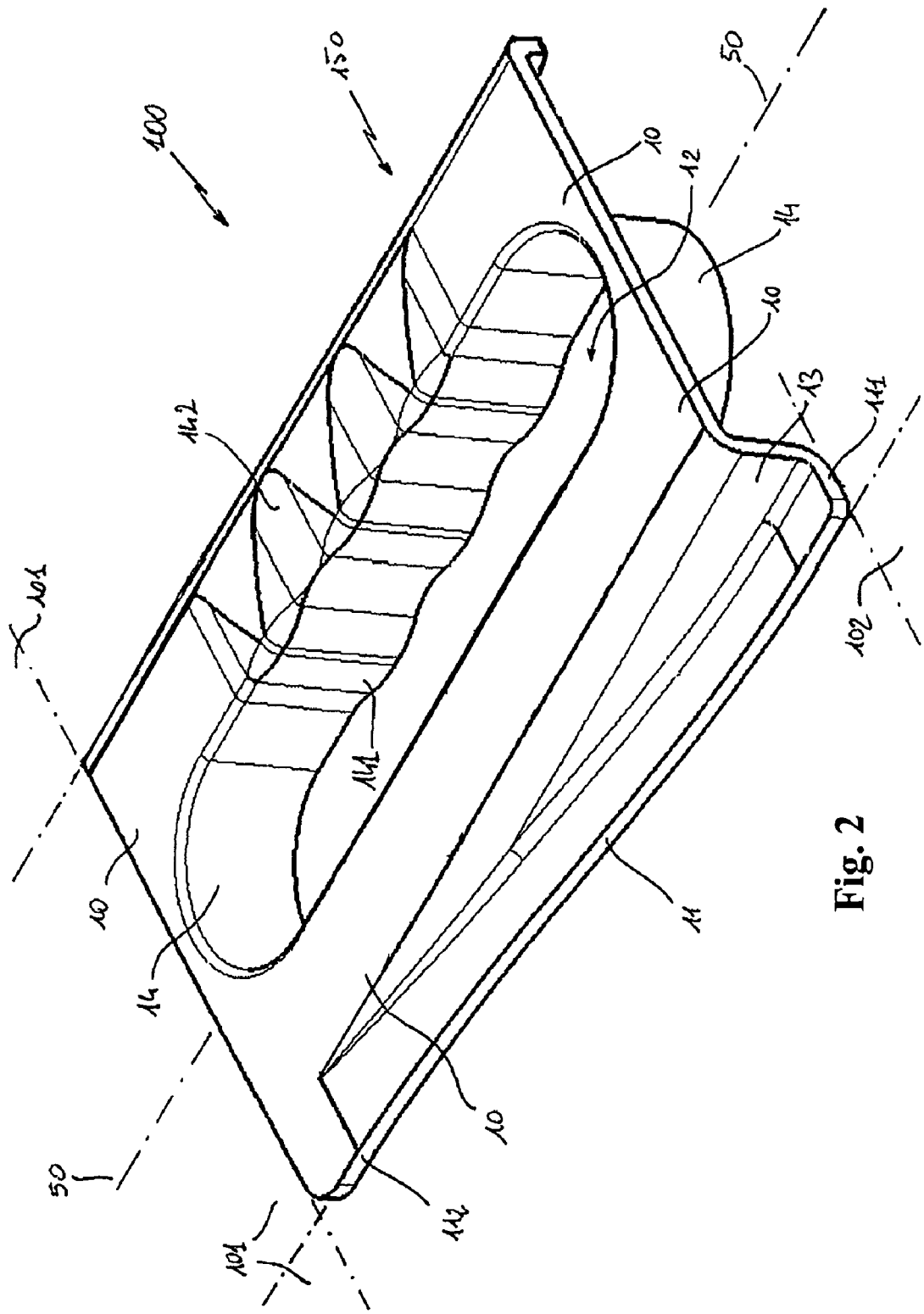
FIG. 2 shows a perspective view of the device according to the invention in a first embodiment.

The device 100 presents substantially the same methods of use also in the embodiment of FIG. 2. In this case, as the device 100 only presents one shaped edge 11, it only allows the operator to act on one predefined side of the duct 200, according to predefined directions of operation.

In the embodiment shown in FIG. 3, instead, due to the evident structural symmetry with respect to the longitudinal axis 50, the device 100 allows the opening and closing operations to be performed on either side of the duct 100, without distinction. The operation can be performed on any side simply by varying the hold appropriately.

Figure 9:
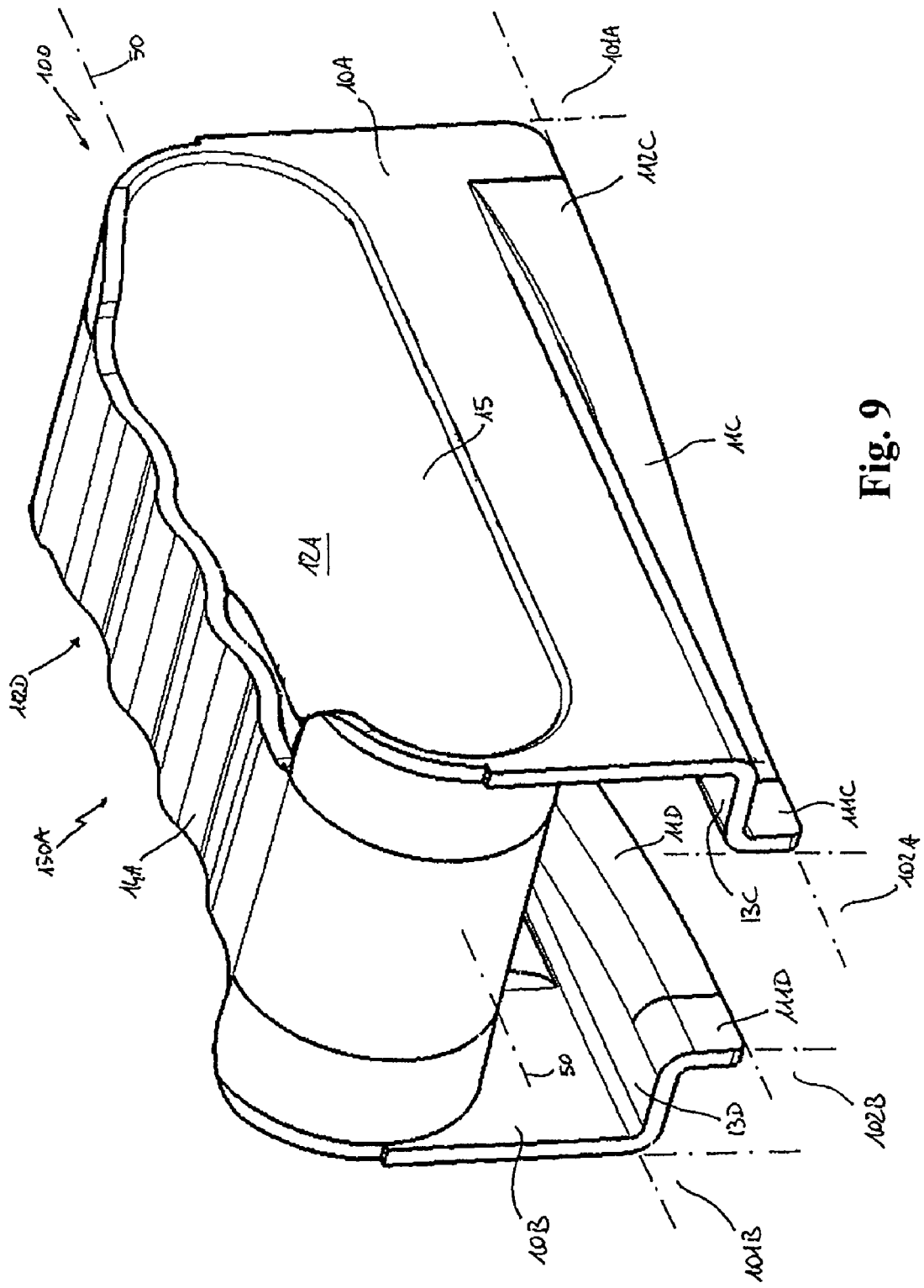
FIG. 9 shows a perspective view of the device according to the invention in a further embodiment.

FIG. 9 shows a further variant of embodiment of the device 100, with which the operator can perform opening or closing of the duct 200, acting simultaneously on both sides 200A-B thereof.

According to this embodiment, the device 100 comprises a main body 150A provided with a first base wall 10A and a second base wall 10B which extend, at least partly, respectively along two different reference planes 101A and 101B, mutually parallel, in opposite positions with respect to the longitudinal axis of extension 50.

A third shaped edge 11C and a fourth shaped edge 11D are associated respectively with the base walls 10A and 10B, in opposite positions with respect to the longitudinal axis 50.

The shaped edges 11C and 11D have ends (first ends or upper ends) 112C and 112D which join respectively with the base walls 10A and 10B. These shaped edges are also provided with further ends (second ends or lower ends) 111C and 111D which lie respectively on further reference planes 102 and 102B, parallel to the reference planes 101A and 101B.

The device 100 also comprises a third joining wall 13C and a fourth joining wall 13D, which are associated respectively with the first base wall 10A and with the second base wall 10B, again in opposite positions with respect to the longitudinal axis 50.

These joining walls respectively mutually connect the first base wall 10A with the third shaped edge 11C and the second base wall 10B with the fourth shaped edge 11D.

The main body 150A preferably also comprises a connecting wall 15 which extends substantially perpendicular to the base walls 10A and 10B, so as to connect them integrally with each other. The connecting wall 15 advantageously joins with a gripping wall 14A, so as to define a second through cavity 12A, oriented substantially perpendicular to the base walls 10A and 10B. The presence of the cavity 12A in the main body 150A is evidently suitable to facilitate holding the device 100 at the gripping wall 14A.

Figure 10:
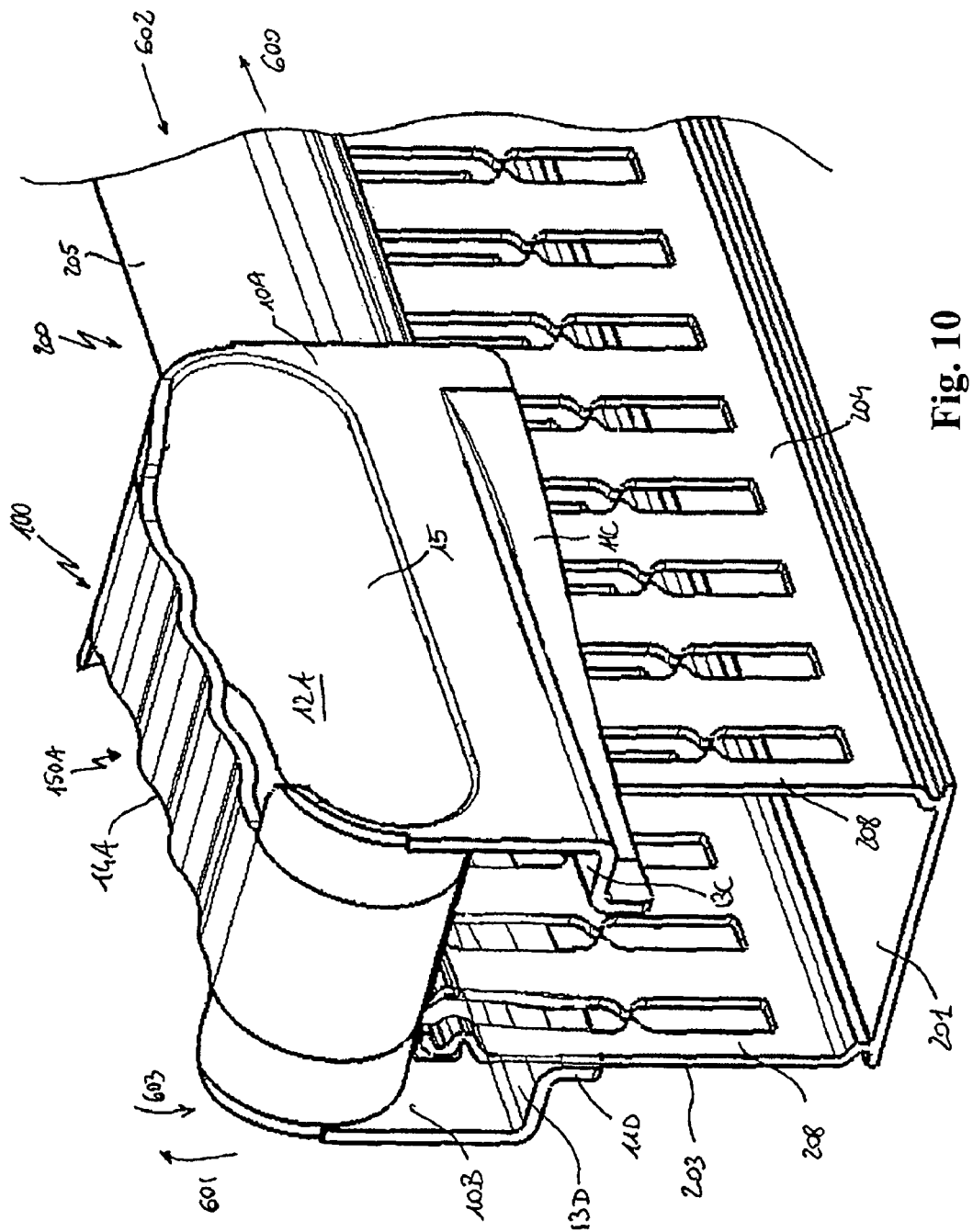
FIG. 10 schematically shows an example of operational use of the device according to the invention in the embodiment of FIG. 9.

Use of the device 100, in the embodiment described above, is now illustrated in greater detail. The device 100 is held by the operator, grasping the main body 150A at the gripping wall 14A, and is positioned operatively on the duct 200 so that the gripping wall 14A is substantially parallel with the cover 205 (FIG. 10).

To perform opening of the cover 205, the device 100 is first positioned on a segment of the duct 200, preferably at an end thereof, and then moved according to the direction 600, i.e. in the direction of the ends 112C and 112D of the shaped edges 11C and 11D, respectively.

During movement of the device 100, the shaped edges 11C and 11D are placed in sliding contact, respectively at their ends 111C and 111D, with the lateral walls 204 and 203 of the duct 200, thus pushing the fins 208 of each of said walls towards the inside of the duct 200. Simultaneously, with a simple upward rotational movement 601, the joining walls 13C and 13D lift the edges of the cover 205, moving them away from the area of engagement with the fins 208.

Moving the device 100 along the duct 200, complete removal of the cover 205 can thus be achieved with a single simple operation.

To close the duct 200 (not shown), the cover 205 must first be manually positioned so that its edges coincide with the lateral walls 203 and 204 of the duct 200.

The device 100 is then positioned operatively in the same manner as shown in FIG. 10 and made to slide according to an opposite direction 602, i.e. in the direction of the ends 112C and 112D of the shaped edges 11C and 11D.

During movement of the device 100, the shaped edges 11C and 11D push the fins 208 of the walls 203-204 towards the inside of the duct 200. A simple rotation 603 of the device 100 towards the base 201 makes the connection wall 15 of the device press against the cover 205, so as to engage the edges of the cover 205 with the fins 208.

By moving the device 100 along the duct 200, complete closing of the cover 205 can thus be achieved.

It has been seen in practice how the device 100 according to the invention allows the objects set to be achieved.

The device 100 can be engaged by the operator with only one hand, like a common working tool, and is simple to use, even when the operator is in awkward positions or positions in which balance is precarious.

With simple operations, it allows the operator to act simultaneously on the cover and on the lateral walls of the cable duct so as to obtain removal/coupling of the cover.

Due to its versatile use, the device 100 allows the operator to rapidly and effectively perform the operations to open and close the cable duct, without damaging the structure, in particular the lateral walls.

From the above, it is evident how the device 100 presents an extremely simplified structure which makes it particularly suitable to produce at industrial level, at relatively low costs. For example, it can be produced by means of common molding processes of thermoplastic or metal materials.

On the basis of the description provided, other characteristics, modifications or improvements are possible and evident to a person skilled in the art. These characteristics, modifications and improvements should therefore be considered part of the present invention.

The invention claimed is:

1. A device for opening or closing cable duct or both comprising:
   at least one main body structured so as to define a gripping surface for an operator, said main body comprising at least a first base wall wherein at least part of the at least one base wall extends, according to at least one reference plane; and at least one shaped edge which extends from said base wall towards a further reference plane, which is parallel to said at least one reference plane; and at least one joining wall which connects said base wall and said shaped edge integrally with each other;

wherein said device is for being associated in a movable manner with said duct, so that said shaped edge comes in sliding contact with a lateral wall of said duct, which comprises one or more fins and exerts a force (F1) on the lateral wall of said duct, which causes a bending of said one or more fins of said lateral wall, during a movement of said device along said duct.

2. A device as claimed in claim 1, wherein said shaped edge is provided with an end which joins with said base wall and with a further end which lies on said further reference plane.

3. A device as claimed in claim 1, wherein said reference planes are mutually parallel.

4. A device as claimed in claim 1, wherein said joining wall extends transversely with respect to said base wall and to said shaped edge.

5. A device as claimed in claim 1, wherein said main body comprises a first through cavity, defined by a shaped lateral wall, said through cavity extending substantially perpendicular with respect to said base wall.

6. A device as claimed in claim 1, further comprising a first shaped edge and a second shaped edge, associated with said base wall, in opposite positions with respect to a longitudinal axis of extension of said device.

7. A device as claimed in claim 6, wherein said shaped edges are provided with ends which join with said base wall and with further ends which lie respectively on said further reference plane.

8. A device as claimed in claim 7, wherein it comprises a first joining wall and a second joining wall, associated with said base wall in opposite positions with respect to said longitudinal axis, each of said joining walls mutually connecting said base wall with one of said shaped edges.

9. A device as claimed in claim 1, wherein said main body comprises a first base wall and a second base wall which extend respectively along two different mutually parallel reference planes, said first base wall and said second base wall being located in opposite positions with respect to a longitudinal axis of extension of said device.

10. A device as claimed in claim 9, further comprising a third shaped edge and a fourth shaped edge, associated respectively with said first base wall and with said second base wall, in opposite positions with respect to said longitudinal axis.

11. A device as claimed in claim 10, wherein said shaped edges are provided with ends which respectively join with said base walls and with further ends which lie respectively on further reference planes, parallel to said reference planes.

12. A device as claimed in claim 11, further comprising a third joining wall and a fourth joining wall, associated respectively with said first base wall and with said second base wall, in opposite positions with respect to said longitudinal axis of extension, said third joining wall mutually connecting said first base wall and said third shaped edge, said fourth joining wall mutually connecting said second base wall and said fourth shaped edge.

13. A device as claimed in claim 12, wherein said main body comprises a connecting wall which extends perpendicular to said first base wall and to said second base wall, said connecting wall connecting said first base wall and said second base wall integrally with each other.

14. A device as claimed in claim 13, wherein said connecting wall joins with a gripping wall, so as to define, in said main body, a second through cavity, oriented substantially perpendicular to said first base wall and to said second base wall.

* * * * *